INVENTOR
ERNEST W. PETERSON
BY
Lawrence J. Hurst

United States Patent Office 3,594,196
Patented July 20, 1971

3,594,196
MULTIPURPOSE COOKER METHOD
Ernest W. Peterson, Los Alamitos, Calif., assignor to Ralston Purina Company, St. Louis, Mo.
Filed Dec. 11, 1967, Ser. No. 689,556
Int. Cl. A23b *3/00, 3/06*
U.S. Cl. 99—158                                    4 Claims

ABSTRACT OF THE DISCLOSURE

A method of preparing tuna for canning which prevents surface dehydration and retards enzymatic and oxidative deterioration of the fish from the time of evisceration through precooking and cooling. The method utilizes a chamber having suitable means for refrigerated holding, precooking and cooling of fish. After the fish are eviscerated, they are placed in the chamber under refrigerated conditions to retard deterioration and to attain a uniform temperature throughout the fish. The fish are then subjected to the precooking operation which due to the initial uniform temperature of the fish results in a uniform processing of the fish. After the fish are precooked, they are cooled either by recirculating water saturated refrigerated air through the chamber or by initially utilizing evaporative cooling and thereafter recirculating water saturated refrigerated air through the chamber to cool the fish to a desired temperature.

BACKGROUND OF THE INVENTION

This invention relates to an improved method of refrigerated holding, precooking, cooling and holding of fish prior to canning. This method is particularly useful for canning tuna and tuna-like fish, such fish include albacore, bluefin, bonito, skipjack, yellowfin, and yellowtail; and in this specification the term "tuna" is intended to include all these fish. Heretofore the method of preparing tuna for canning has comprised the steps of thawing the tuna under atmospheric conditions, eviscerating and placing the tuna in wire baskets, placing several racks of these wire baskets into a steam autoclave or cooker, and after the precooking operation, the tuna is cooled by holding them in a room at ambient temperature and humidity. The above described method of processing the precooked tuna had many drawbacks. One of the more significant drawbacks or disadvantageous features was that the tuna prior to the precooking operation had not attained a uniform temperature and therefore was not uniformly cooked or prepared. In addition, the use of ambient air to cool the tuna resulted in dehydration of the tuna meat. Further, the treatment of fish was not uniform since changes in the ambient conditions correspondingly were reflected in the final product which resulted in variations of the surface dehydration and in variations of the oxidative and enzymatic deterioration in the flesh of the fish. Thus, the color and flavor quality of the fish was not uniform.

Attempts to solve these problems have been made but heretofore none have done so satisfactorily. The prior art discloses the use of vacuum conditions for the cooling of tuna. However, utilizing vacuum conditions for cooling did not solve the problem since the fish meat, being hotter in the center and having a higher pressure thereat, tend to explode or disintegrate. Furthermore, the moisture was carried off during such vacuum condition cooling which resulted in the tuna meat being dehydrated. Also, the equipment used for effecting these vacuum conditions had to be reenforced to withstand the pressures which made this equipment very expensive.

Other prior art attempts to solve this problem required the use of a substantially oxygen free zone into which an inert gas was introduced in quantities sufficient to maintain the pressure at a substantially atmospheric level during the cooling of the tuna. The method of cooling had the disadvantageous or undesirable feature of requiring special containers and means for supplying the inert gas to the cooling chamber or zone. In addition, it was very expensive to utilize this type of system in the cooling of tuna.

Therefore, it is the prime object of this invention to provide a method of precooking and cooling tuna which is economic to operate and which does not require the use of an inert gas or rely on a vacuum condition.

Another object of this invention is to provide a method of holding, precooking and cooling tuna which does not deleteriously affect the odor and flavor of the product.

Another object of the present invention is to provide a method which reduces oxidative deterioration and enzymatic changes of the tuna to produce a product having good color, odor and flavor qualities.

Another object of the present invention is to provide a method for the treatment of tuna which does not rely on ambient conditions and which tends to standardize the treatment given to various batches of fish.

Still another object of the present invention is to provide means for efficiently cooling the cooked tuna by initially utilizing evaporative cooling to cool the tuna to a predetermined temperature, thereafter utilizing a closed air recirculation type of cooling.

Still another object of the present invention is to utilize water sprays in the cooling of the tuna to reduce the dehydration effect of the precooking operation.

These and other objects and advantages will become apparent hereinafter.

Briefly, the present invention comprises a method of preparing tuna for canning wherein the tuna is kept in a chamber having suitable means for moisturizing the air and the tuna to prevent surface dehydration from the time of evisceration through the stages of refrigerated holding, precooking and cooling until removed for canning.

In the drawings which illustrate an embodiment of the present invention,

Figure 1:
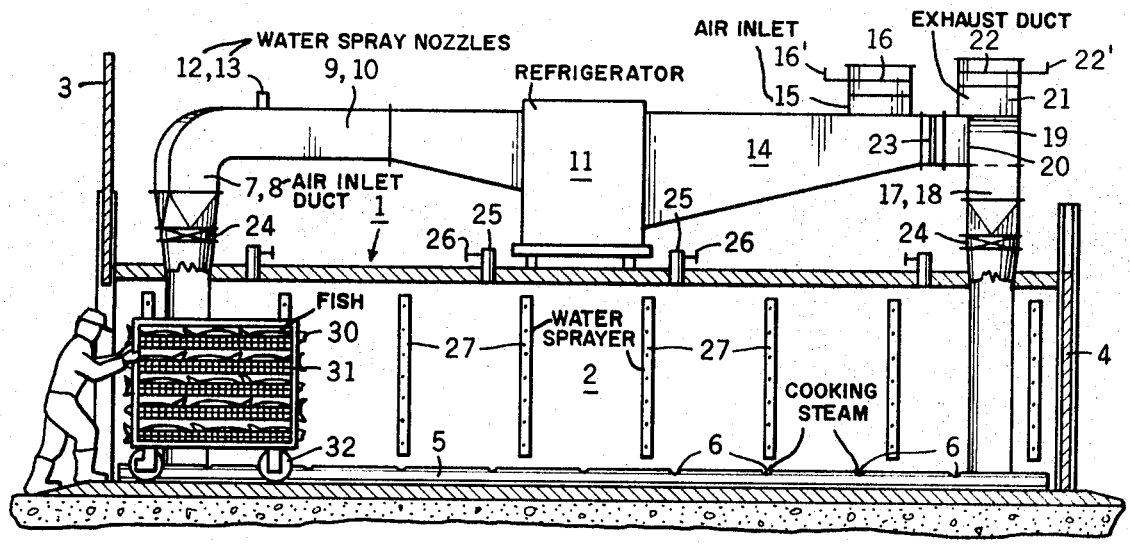
FIG. 1 is a somewhat diagrammatic view in side elevation of an autoclave suitable for refrigerated holding, precooking and later cooling fish in accordance with the principles of the present invention; the autoclave is shown while it is being loaded with fish in fish-holding racks.
Figure 2:
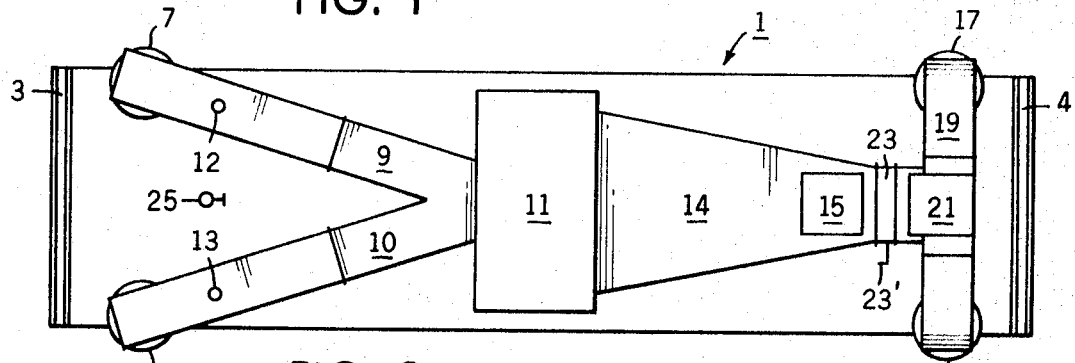
FIG. 2 is a top view of the autoclave of FIG. 1.

Referring now to FIGS. 1 and 2, the present invention may be practiced with an autoclave indicated generally at 1 that serves as a combination refrigerated holding, precooking and cooling chamber 2. The chamber 2 may be in any shape, but is generally rectangular with a loading door 3 at the inlet end thereof and an unloading door 4 at the opposite or outlet end thereof. A pipe 5 having a plurality of openings 6 thereon is provided in the chamber 2 adjacent the bottom or floor thereof to supply said chamber with cooking steam from a suitable source of steam (not shown). The chamber 2 is also provided with a pair of air inlet ducts 7 and 8 adjacent to the loading door 3. The inlet air ducts 7 and 8 are connected by suitable ducting 9 and 10 to a refrigeration coil or unit 11, including a fan, which is mounted on top of the autoclave 1. A pair of spray nozzles 12 and 13 are provided in the ducts 8 and 9, respectively, and said nozzles are connected to a suitable moisture source (not shown) to adjust the humidity of the air being supplied to the chamber 2 through the inlet ducts 7 and 8. Another duct 14 is provided on the opposite or inlet side of the refrigeration unit 11 and is intersected by an inlet air duct 15 communicating with the atmosphere. The inlet air duct 15 is provided with a valve or damper 16 and a handle 16' is connected to said valve for effecting the movement thereof between an open position permitting air flow through the duct 16 and a closed position preventing air flow therethrough.

Another pair of ducts 17 and 18 are provided on opposite sides of the chamber 2 adjacent to the unloading door 4 and are connected by a cross duct 19. The cross duct 19 connects with the duct 14, at a point indicated generally at 20, and at this point is provided an exhaust duct 21 which communicates with the atmosphere. The exhaust duct 21 is provided with a valve or damper 22 and a handle 22' is connected to said valve for effecting the movement thereof between an open position permitting air flow through the duct 21 and a closed position preventing air flow therethrough. It should be noted that another valve or damper 23 is provided in the duct 14 intermediate the junctions of the ducts 15 and 21 therewith and a handle 23' is connected to said valve to effect the movement thereof between its open and closed positions. Also, it should be noted that butterfly valves 24 are provided in each of the inlet and outlet ducts 7, 8 and 17, 18 respectively such that when the valves 24 are closed, the chamber 2 is isolated from the ducts communicating with the atmosphere and the refrigeration unit 11. A plurality of exhaust valves 25 are provided in the autoclave 1 at the top of the chamber 2 to permit the exhaustion of atmospheric air from said chamber when steam is supplied thereto. The exhaust valves 25 are provided with handles 26 for effecting the movement of said valves between their open and closed positions. In addition, a plurality of spray nozzles indicated generally at 27 are provided in the walls of the chamber 2 for discharging moisture into said chamber as will be discussed more fully herein.

Figure 3:
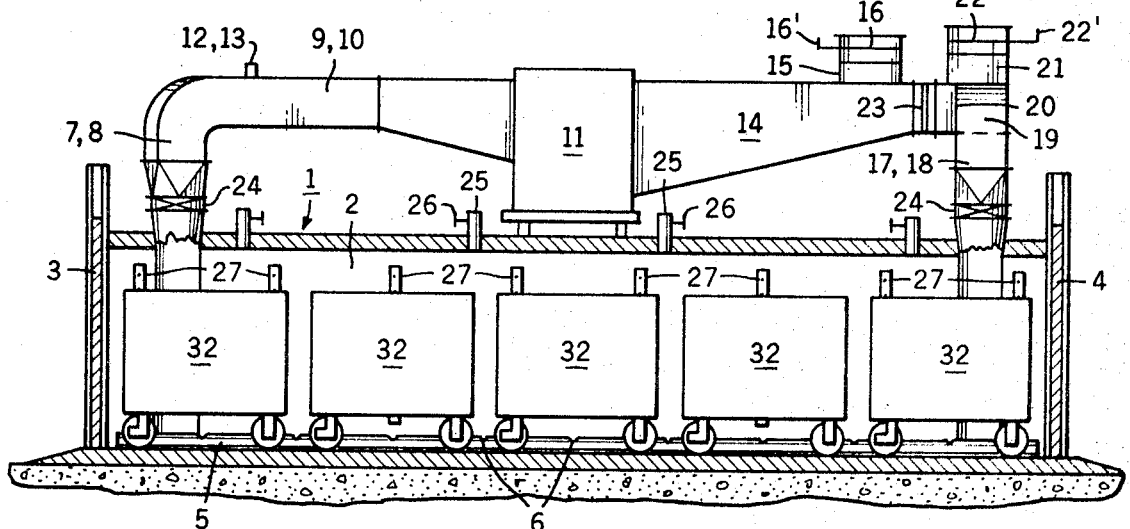
FIG. 3 is a view of the autoclave of FIG. 1 with the doors thereof closed.

In the processing of fish, as shown in FIG. 1, the whole fish 30 are placed in wire baskets 31 that are loaded upon wheeled racks 32, and the loaded racks 32 are moved into the chamber 2 through the loading door 3, the unloading door 4 being closed. When the chamber 2 has been filled with the racks 32, the loading door 3 is closed, so that both doors are shut (see FIG. 3), and the interior of the chamber 2 is then substantially isolated from the atmosphere.

Initially, the fish are subjected to a refrigerated holding operation. This refrigerated holding operation is effected by opening the butterfly valves 24 and the valve 23 and closing the valves 16 and 22 such that a closed air or recirculation system is established. With the closed air or recirculation system, the air in the chamber 2 is exhausted through the ducts 17, 18, 19 and 14 through the refrigeration unit 11 and therefrom through the ducts 9, 10 and 7, 8 back into the chamber 2. The refrigerated air normally has a temperature between 30–35° F. and as it passes through the ducts 9 and 10, moisture is added from the nozzles 12 and 13 in response to a demand from a humidistat (not shown) to maintain the relative humidity of the refrigerated air at 100%. In addition, it may be desirable to continually spray water on the fish 30 from the nozzles 27. This serves to maintain the surface of the fish 30 moist so that the dehydration effect of storage is reduced. Further, the refrigerated holding serves to reduce the deterioration of quality and yield which normally accompanies the holding of fish.

This refrigerated holding period will extend for such a period of time that the fish are allowed to cool to a uniform desired temperature in the range of 30–35° F., but the fish is not maintained in a frozen or solid state. The average holding time will be approximately 8 hours prior to precooking; however, this holding time may vary from 2 hours up to several days depending upon the production schedules of the fish operating plants. Thus, this refrigerated holding allows for a more flexible schedule for the processing of fish and retards the deterioration of the quality of the fish normally encountered in the holding of fish.

After the fish have been held for a predetermined time such that they are no longer in the frozen state and are uniformly cooled throughout, the fish subjected to a precooking operation. To effect the precooking operation, the butterfly valves 24 are closed to isolate the chamber 2 from the atmosphere and from the refrigeration unit 11. In addition, the water spray from the nozzles 27 is turned off if it is being used and the exhaust valves 25 are then opened to connect the chamber 2 with the atmosphere. Steam is then supplied through the pipe 5 and openings 6 therein to the chamber 2. The supplying of steam to the chamber 2 while the exhaust valves 25 are open permits the cool ambient air to be vented from the chamber. After the cool ambient air is vented from the chamber 2, approximately 10 to 15 minutes, the exhaust valves 25 are closed to again isolate the chamber 2 from the atmosphere and the refrigeration unit 11. This venting operation to effect the removal of the cool ambient air prior to the precooking of the fish serves to reduce the oxidation of the surface fats of the fish during precooking.

Steam is then supplied through the nozzles 5 to raise the temperature in the chamber 2 and to precook the raw fish. The cooking operation lasts for a suffifficient period of time to raise the temperature of the fish meat at the backbone at least 135° F. Of course, it is obvious that the cooking time will vary depending on the species of fish being processed and the essential parameter for this operation is the minimum temperature of 135° F. at the backbone of the fish. In a normal precooking operation, there is an appreciable amount of dehydration losses which is somewhat overcome by applicants' using saturated steam which reduces dehydration losses. In addition, the holding of the fish in a water saturated air atmosphere preparatory to precooking aids in minimizing the dehydration effect of the steam cooking.

Upon the completion of the precooking operation, the steam supplied to the chamber 2 is interrupted or shut off and the fish are subjected to a cooling operation. This is accomplished by initially subjecting the fish to evaporative cooling by opening the butterfly valves 24, valve 16 and valve 22 and closing the valve 23, so that an open air system is established. The fan portion of the cooling unit 11 is turned on, which serves to pull ambient air through the ducts 15 and 14. The fan then forces the air through the ducts 9, 10, 7 and 8 into the chamber 2 and passes therefrom through the ducts 17, 18, 19, and 21 where it is exhausted to atmosphere. As the ambient air is passed through the chamber 2 to effect cooling of the fish therein, a spray of water in ejected from the nozzles 27 to contact the surfaces of the fish which not only reduces the dehydration thereof, but also assists in the cooling due to the evaporation cooling effected by the air passing over the moist surface of the fish. The evaporative cooling operation effects the rapid cooling of the fish from the elevated temperature of at least 135° F. at the backbone thereof. This rapid cooling of the fish by the evaporative cooling operation reduces the oxidative affect of the pre-cooking operation and also retards the dehydration of the fish meat. The length of time this evaporative cooling operation lasts will be dependent upon the size and species of the fish being processed and also on the temperature of the ambient air. A typical evaporative cooling operation would last for approximately 1½ hours and reduces the temperature of the fish at the backbone from approximately 135° F. to an intermediate temperature, such as approximately 100° F.

After the evaporative cooling operation, the fish are subjected to a refrigerative cooling operation to reduce the temperature of the fish to a desired temperature at the backbone of approximately 60–85° F. The refrigerative cooling operation is effected by closing the valves 16 and 22 and opening the valve 23 such that the closed recirculation system as utilized in the refrigerated holding operation (as hereinabove described) is established. The refrigeration unit 11 serves to dissipate the heat as the air recirculates through the system and this air is maintained at a 100% relative humidity by the moisture injected into the air stream through the nozzles 12 and 13 in response to the humidistat (not shown). In addition, depending on the species of the fish being processed, it may be desirable to intermittently activate the nozzles 27 to supply moisture to the surface of the fish as they are subjected to this refrigerated cooling operation. The length of the refrigerative cooling operation will be dependent upon the size and species of the fish being processed and the temperature of the fish when the transfer is made from the evaporative cooling operation to the refrigerative cooling operation. It should also be understood that although the refrigerative cooling operation will be utilized to reduce the temperature of the fish to approximately 60–85° F., which it has been found to be the most desirable temperature for handling and for further processing, it is possible with this system to reduce the temperature of the fish to any desired level. Thus it may be possible to reduce the temperature of the fish to a value suitable for refrigerative storage for later use depending on production schedules, etc. Since the normal holding temperature of fish is approximately 35° F., it may be desirable to cool the fish to this temperature and store them for subsequent use.

It should be realized that since the fish are not cooled in ambient conditions, that a more uniform cooling is effected such that the end product can be more closely controlled and uniformly produced. In addition, the fish may be held for extended periods of time after the precooking operation without deleteriously affecting the fish. The refrigerated conditions reduce quality deterioration and yield losses normally experienced in the ambient air type of holding operation.

Further, it should be understood that the cooling operation does not necessarily have to be performed in the two stage operation (evaporative cooling followed by refrigerated cooling), but may be accomplished merely by using the refrigerative cooling operation. In this instance, the precooked fish will be subjected to the closed system of recirculating water saturated refrigerated air. In utilizing this method, it would not be necessary to expose the fish to ambient air conditions for evaporative cooling but would merely require the refrigeration cooling to reduce the temperature of the fish from 135° F. at the backbone to the desired temperature.

From the foregoing, it is now apparent that a novel multi-purpose cooker and method of processing tuna meeting the objects set out hereinbefore is provided and that changes or modifications as to the precise configurations, shapes and details of the construction and method set forth in the disclosure by way of illustration may be made by those skilled in the art without departing from the spirit of the invention as defined by the claims which follow.

I claim:
1. A method of treating whole tuna-like fish which have been eviscerated then disposed in a chamber wherein the fish is refrigerated, precooked and cooled prior to canning, and comprising the steps of placing the fish in the chamber, holding the fish under refrigeration in the chamber to obtain a substantially uniform temperature of about 30–35° F. throughout the fish by circulation of refrigerated air at said temperature through the chamber and including spraying water into the air prior to passage into the chamber to maintain the relative humidity of the refrigerated air at about 100%, thereafter precooking the fish in the chamber by venting cool ambient air from the chamber and introducing steam therein until the fish at its backbone attains a temperature of at least approximately 135° F. and then cooling the fish in the chamber by initially passing ambient air therethrough to lower the temperature of the fish and thereafter recirculating water saturated refrigerated air in said chamber to affect the further cooling of the fish to a desired temperature and to prevent substantial dehydration of the fish during cooling.

2. The method of treating tuna-like fish as set forth in claim 1 wherein the fish are cooled to a temperature in the range of 100°–35° F.

3. The method of treating tuna-like fish as set forth in claim 1 wherein the precooked fish are initially cooled by the evaporative cooling to a temperature at the backbone of the fish of approximately 100° F. and thereafter the fish are further cooled by the recirculating water saturated refrigerated air to a temperature in the range of 85°–35° F.

4. The method of treating tuna-like fish as set forth in claim 1 wherein the recirculating water saturated air is maintained in the range of 30°–35° F.

References Cited

UNITED STATES PATENTS

| | | | |
|---|---|---|---|
| 2,493,586 | 1/1950 | Lang | 99—188X |
| 2,635,050 | 4/1953 | Stevenson et al. | 99—160X |
| 3,028,969 | 4/1962 | Borg | 210—330 |
| 3,161,526 | 12/1964 | Mencacci | 99—188 |
| 1,556,772 | 10/1925 | Endo | 99—112X |
| 3,108,882 | 10/1963 | Nash et al. | 99—111X |
| 3,137,581 | 6/1964 | Toft | 99—158 |
| 3,205,049 | 9/1965 | Lannert et al. | 99—158UX |
| 3,249,442 | 5/1966 | Keyes et al. | 99—18 |
| 3,170,794 | 2/1965 | Jeffreys et al. | 99—158X |

FOREIGN PATENTS 743,497    9/1966    Canada    99—158

NORMAN YUDKOFF, Primary Examiner
F. E. DRUMMOND, Assistant Examiner

U.S. Cl. X.R.
99—188, 195